(12) United States Patent
Nojima et al.

(10) Patent No.: US 12,322,421 B2
(45) Date of Patent: Jun. 3, 2025

(54) DISK DEVICE

(71) Applicants: Kabushiki Kaisha Toshiba, Tokyo (JP); Toshiba Electronic Devices & Storage Corporation, Tokyo (JP)

(72) Inventors: Yusuke Nojima, Yokohama Kanagawa (JP); Takuma Kido, Mitaka Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/464,111

(22) Filed: Sep. 8, 2023

(65) Prior Publication Data
US 2024/0321298 A1  Sep. 26, 2024

(30) Foreign Application Priority Data
Mar. 23, 2023 (JP) .................................. 2023-046718

(51) Int. Cl.
*G11B 5/48* (2006.01)
(52) U.S. Cl.
CPC ............ *G11B 5/4833* (2013.01); *G11B 5/483* (2015.09); *G11B 2220/2516* (2013.01)
(58) Field of Classification Search
None
See application file for complete search history.

(56) References Cited

U.S. PATENT DOCUMENTS

| | | | | |
|---|---|---|---|---|
| 5,243,482 A | * | 9/1993 | Yamaguchi | G11B 5/4826 360/245.1 |
| 6,597,536 B2 | * | 7/2003 | Tsuchiyama | G11B 5/6005 360/235.8 |
| 7,706,105 B2 | * | 4/2010 | Maslov | G11B 5/4826 360/245.1 |

(Continued)

FOREIGN PATENT DOCUMENTS

| | | | |
|---|---|---|---|
| CN | 101339774 A | * 1/2009 | |
| CN | 110060705 A | * 7/2019 | .......... G11B 5/4826 |

OTHER PUBLICATIONS

"Effect of dimple offset on the operational shock performance of small form factor drives," Bhargava et al., Computer Mechanics Lab, UC Berkeley, manuscript received on Aug. 31, 2006. (Year: 2006).*

(Continued)

*Primary Examiner* — William J Klimowicz
(74) *Attorney, Agent, or Firm* — Kim & Stewart LLP (57) ABSTRACT

According to one embodiment, a disk device includes a load beam, a first protrusion, a flexure, a slider, and a second element. The first protrusion protrudes from the load beam away from a rotation axis in a first direction. The flexure includes a mounting part supported by the first protrusion. The slider is mounted on the mounting part, and includes a first element that reads and writes information from and to a magnetic disk, and a floating surface facing the magnetic disk. The second element is attached to the slider apart from a geometric center of the floating surface in the first direc- (Continued)

tion. On a projection plane as viewed in a direction orthogonal to the floating surface, a contact position between the first protrusion and the mounting part is located between a geometric center of the slider and a center of gravity of the second element.

11 Claims, 8 Drawing Sheets

(56) References Cited

U.S. PATENT DOCUMENTS

| | | | | |
|---|---|---|---|---|
| 8,085,508 B2* | 12/2011 | Hatch | ............... | G11B 5/4833 360/245.3 |
| 8,780,501 B2* | 7/2014 | Kuwajima | ........... | G11B 5/4826 360/245.3 |
| 8,797,690 B2* | 8/2014 | Tao | ................. | G11B 5/48 360/234.6 |
| 8,848,318 B2* | 9/2014 | Tsuchiyama | ......... | G11B 5/6088 360/245.1 |
| 8,896,970 B1 | 11/2014 | Miller et al. | | |
| 9,013,835 B2 | 4/2015 | Chua | | |
| 9,966,093 B1* | 5/2018 | Naniwa | ............... | G11B 5/4833 |
| 2008/0239577 A1* | 10/2008 | Zeng | ................ | G11B 5/4826 360/245.1 |
| 2014/0104996 A1* | 4/2014 | Tsuchiyama | ......... | G11B 5/4826 369/13.17 |
| 2016/0267928 A1* | 9/2016 | Kuwajima | ............. | G11B 5/484 |
| 2021/0287701 A1* | 9/2021 | Kudo | .................. | G11B 5/6088 |
| 2022/0139421 A1* | 5/2022 | Noguchi | ............. | G11B 5/4826 360/245.3 |

OTHER PUBLICATIONS

"Counter Mass for Dimple Shift Slider," author unknown, Publishing Source: The ip.com Journal, publication date: Mar. 13, 2012 (Year: 2012).*

* cited by examiner

DISK DEVICE

CROSS-REFERENCE TO RELATED APPLICATIONS

This application is based upon and claims the benefit of priority from Japanese Patent Application No. 2023-046718, filed on Mar. 23, 2023, the entire contents of which are incorporated herein by reference.

FIELD

Embodiments described herein relate generally to a magnetic disk device.

BACKGROUND

Disk devices such as a hard disk drive includes a slider with a head element that reads and writes information from and to a magnetic disk. A disk device including a slider having an additional element such as a laser diode attached is also known.

The slider is rotatably supported by a protrusion of the load beam, for example. However, attaching the additional element to the slider may result in shifting the center of gravity of the entire slider from the supported position by the protrusion.

DETAILED DESCRIPTION

In general, according to one embodiment, a disk device includes a magnetic disk, a load beam, a first protrusion, a flexure, a slider, and a second element. The magnetic disk has a recording surface. The load beam is rotatable around a rotation axis. The first protrusion protrudes from the load beam away from the rotation axis in a first direction orthogonal to the rotation axis. The flexure includes an attachment part attached to the load beam, and a mounting part rotatably supported by the first protrusion with respect to the attachment part. The slider is mounted on the mounting part. The slider includes a first element configured to read and write information from and to the magnetic disk, and a floating surface configured to face the recording surface when the first element reads and writes information from and to the magnetic disk. The second element is attached to the slider apart from a geometric center of the floating surface in the first direction. On a projection plane as viewed in a direction orthogonal to the floating surface, a contact position between the first protrusion and the mounting part is located between a geometric center of the slider and a center of gravity of the second element.

First Embodiment

Hereinafter, a first embodiment will be described with reference to FIGS. 1 to 4. Note that, in the present specification, components according to embodiments and descriptions of the components may be stated in a plurality of expressions. The components and the descriptions thereof are examples, and are not limited by the expression herein. The components may also be identified with names different from those herein. In addition, the components may also be described by an expression different from the expression herein.

Figure 1:
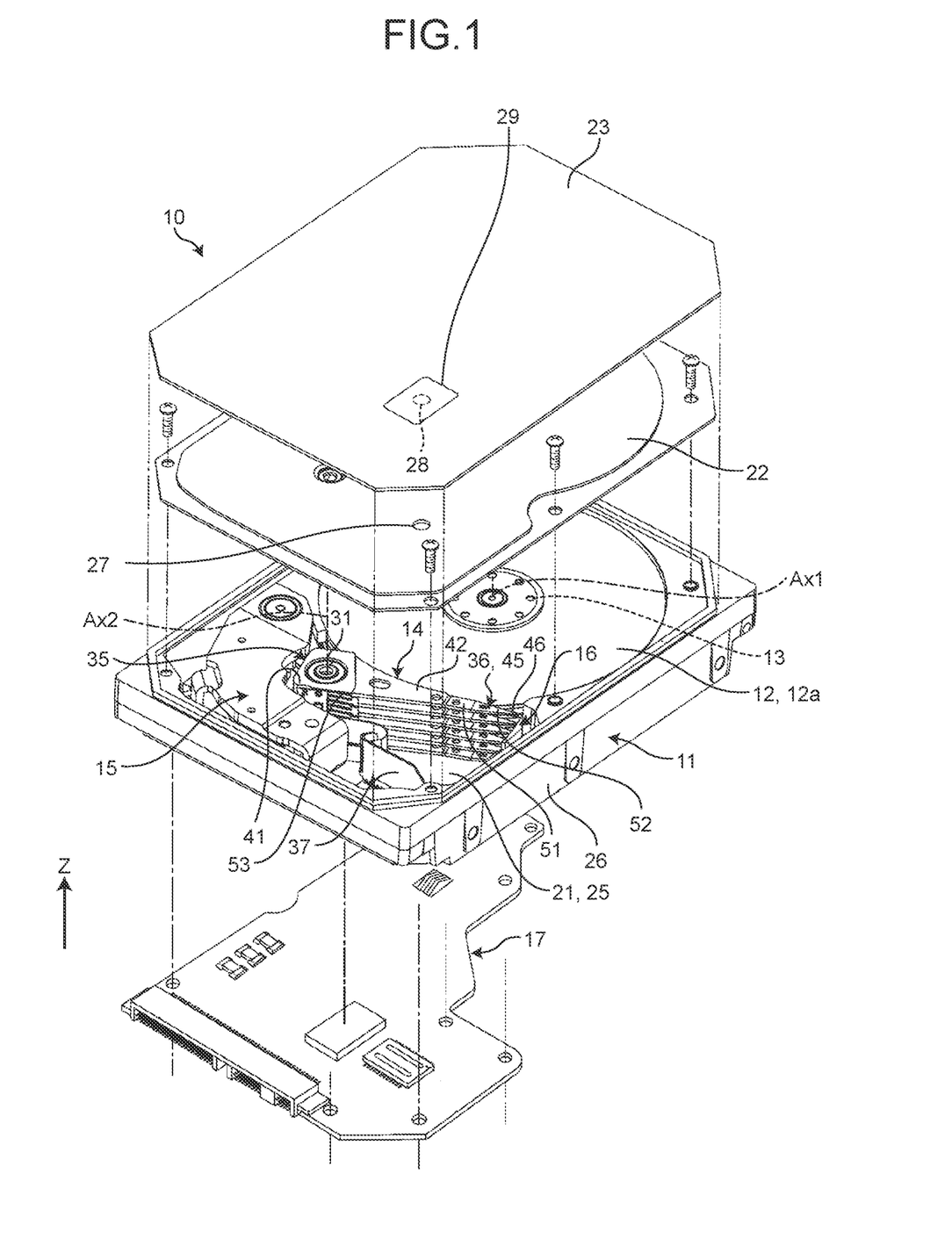
FIG. 1 is an exemplary exploded perspective view illustrating an HDD according to a first embodiment.

FIG. 1 is an exemplary exploded perspective view illustrating a hard disk drive (HDD) 10 according to the first embodiment. The HDD 10 is an example of the disk device, and may also be referred to as an electronic device, a storage device, an external storage device, or a magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. Note that the HDD 10 is not limited to this example.

As illustrated in FIG. 1, a Z axis and a Z direction are defined herein for convenience. The Z axis virtually extends along the thickness of the HDD 10. The Z direction is a direction along the Z axis, and includes a +Z direction and a −Z direction. The +Z direction is a direction indicated by the arrow of the Z axis. The −Z direction is a direction opposite to the +Z direction.

The housing 11 includes a base 21, an inner cover 22, and an outer cover 23. Each of the base 21, the inner cover 22, and the outer cover 23 is made of, for example, a metal material such as an aluminum alloy.

The base 21 has a substantially rectangular parallelepiped box shape opened in the +Z direction. The plurality of magnetic disks 12, the spindle motor 13, the HSA 14, the VCM 15, and the ramp load mechanism 16 are housed inside the base 21.

The base 21 has a bottom wall 25 and a side wall 26. The bottom wall 25 has a substantially rectangular (quadrangular) plate shape arranged to be substantially orthogonal to the Z direction. The side wall 26 protrudes in the substantially +Z direction from the edge of the bottom wall 25 and has a substantially rectangular frame shape.

The inner cover 22 is attached to the end of the side wall 26 in the +Z direction with a screw, for example. The outer cover 23 covers the inner cover 22 and is attached to the end of the side wall 26 in the +Z direction by welding, for example.

The inner cover 22 is provided with a vent 27. Furthermore, the outer cover 23 is provided with a vent 28. After the components are attached to the inside of the base 21, and the inner cover 22 and the outer cover 23 are attached to the base 21, the air inside the housing 11 is removed from the vents 27 and 28. Furthermore, the housing 11 is filled with a gas different from air.

The infill gas inside the housing 11 is, for example, a low density gas having a density lower than that of air, an inert gas having low reactivity, or the like. For example, helium is put into the housing 11. The inside of the housing 11 may be filled with another fluid. In addition, the inside of the housing 11 may be maintained at vacuum, low pressure close to vacuum, or negative pressure lower than atmospheric pressure.

The vent 28 of the outer cover 23 is closed by a seal 29. The seal 29 hermetically seals the vent 28 and prevents the fluid from leaking from inside the housing 11 through the vent 28.

The plurality of magnetic disks 12 are arranged orthogonally to the Z direction. The diameter of the magnetic disk 12 is, for example, about 3.5 inches. Note that the diameter of the magnetic disk 12 is not limited to this example.

Each of the plurality of magnetic disks 12 has, for example, at least one recording surface 12a. The recording surface 12a is provided on at least one of the upper surface and the lower surface of the magnetic disk 12. In other words, each of the plurality of recording surfaces 12a is a surface of the magnetic disk 12 facing substantially the +Z direction or a surface of the magnetic disk 12 facing substantially the −Z direction. The recording surface 12a is a plane substantially orthogonal to the Z direction. The magnetic recording layer of the magnetic disk 12 is provided on the recording surface 12a.

The spindle motor 13 supports the plurality of magnetic disks 12 stacked at intervals in the Z direction. The spindle motor 13 rotates the plurality of magnetic disks 12 around an axis Ax1 of the spindle motor 13. The axis Ax1 extends in the Z direction. The plurality of magnetic disks 12 are held by a hub of the spindle motor 13 using, for example, a clamp spring.

Figure 2:
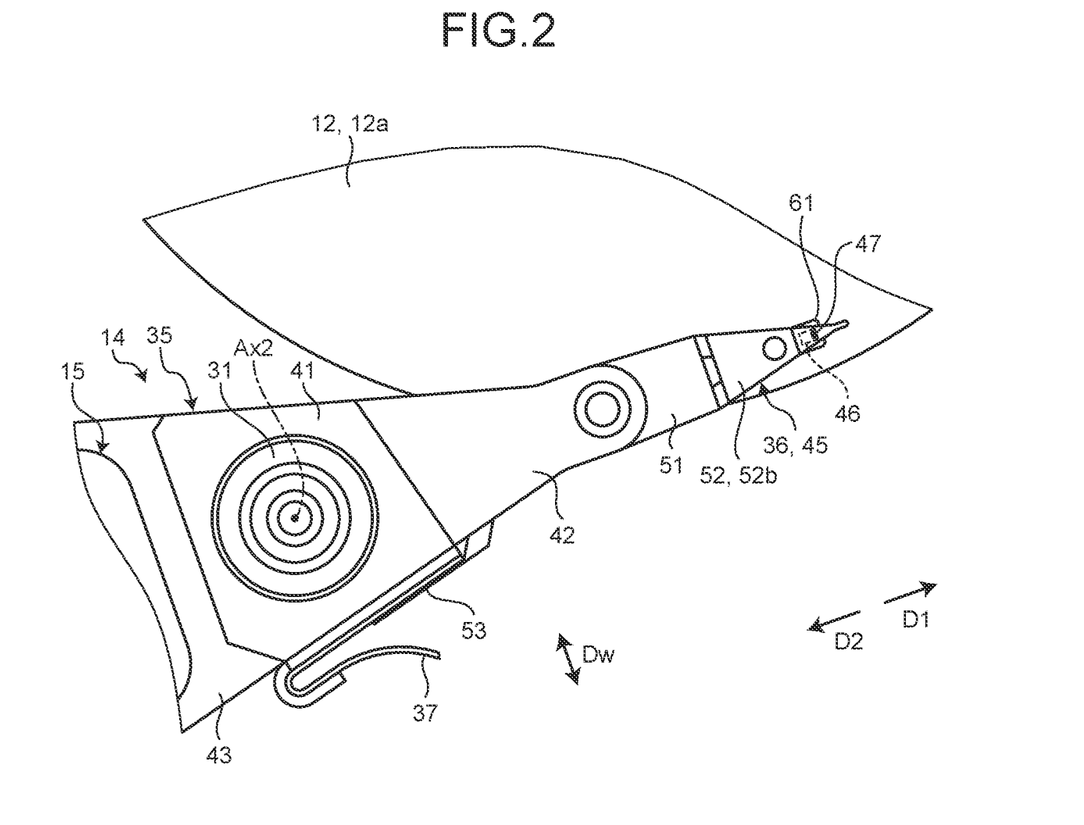
FIG. 2 is an exemplary plan view illustrating a magnetic disk and an HSA of the first embodiment.

FIG. 2 is an exemplary plan view illustrating the magnetic disk 12 and the HSA 14 of the first embodiment. As illustrated in FIG. 2, the HSA 14 is rotatably supported by a support shaft 31. The support shaft 31 is provided at a position separated from the magnetic disk 12 in a direction orthogonal to the axis Ax1. The support shaft 31 extends, for example, in the substantially +Z direction from the bottom wall 25 of the housing 11.

The HSA 14 can rotate around an axis Ax2. The axis Ax2 is an example of the rotation axis and is a virtual axis extending in the Z direction. The axis Ax2 is, for example, the center of rotation of the HSA 14 and also the axis of the support shaft 31.

Hereinafter, an axial direction, a radial direction, and a circumferential direction are defined for convenience. The axial direction is a direction along the axis Ax2. In the present embodiment, the axis Ax2 extends in the Z direction. Therefore, the axial direction includes the +Z direction and the −Z direction. The radial direction is a direction orthogonal to the axis Ax2, and includes a plurality of directions orthogonal to the axis Ax2. The circumferential direction is a direction rotating around the axis Ax2, and includes a direction rotating clockwise around the axis Ax2 and a direction rotating counterclockwise.

The radial direction includes a first direction D1 and a second direction D2. The first direction D1 is one direction included in the radial direction. That is, the first direction D1 is a direction orthogonal to the axis Ax2. The second direction D2 is opposite to the first direction D1.

The HSA 14 includes a carriage 35, a plurality of head gimbal assemblies (HGA) 36, and a flexible printed circuit board (FPC) 37. The carriage 35 includes an actuator block 41, a plurality of arms 42, and a frame 43.

The actuator block 41, the plurality of arms 42, and the frame 43 are integrally formed of, for example, an aluminum alloy. Note that the materials of the actuator block 41, the arm 42, and the frame 43 are not limited to this example.

The actuator block 41 is rotatably supported by the support shaft 31 via a bearing, for example. The plurality of arms 42 protrude from the actuator block 41 in the first direction D1. The carriage 35 may be divided, and the arm 42 may protrude from each of the plurality of actuator blocks 41.

The plurality of arms 42 are arranged at intervals in the axial direction. Each of the arms 42 has a plate shape to enter a gap between two adjacent magnetic disks 12 among the plurality of magnetic disks 12. The plurality of arms 42 extend substantially in parallel.

The frame 43 protrudes from the actuator block 41 in the second direction D2. The frame 43 holds a voice coil of the VCM 15. The VCM 15 includes the voice coil, a pair of yokes, and a magnet provided on the yokes.

The plurality of HGAs 36 are attached to the end in the first direction D1 of a corresponding one of the plurality of arms 42. The HGA 36 protrudes from the corresponding arm 42 approximately in the first direction D1. Thus, the plurality of HGAs 36 are arranged at intervals in the axial direction.

Figure 3:
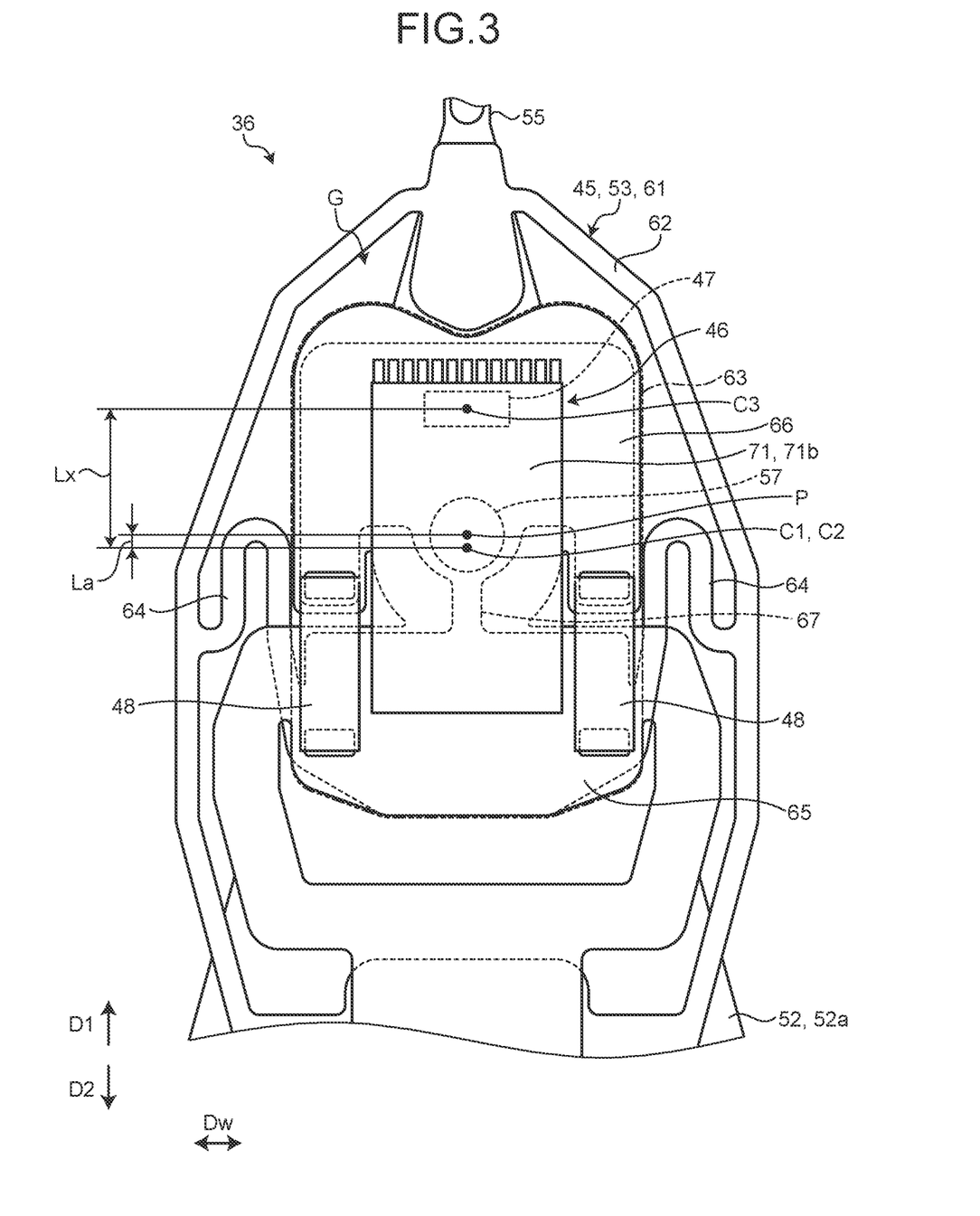
FIG. 3 is an exemplary plan view illustrating a part of an HGA of the first embodiment.

FIG. 3 is an exemplary plan view illustrating a part of the HGA 36 of the first embodiment. As illustrated in FIG. 3, each of the plurality of HGAs 36 includes a suspension 45, a slider 46, a laser diode unit (LDU) 47, and two microactuators (MA) 48. The slider 46 may also be referred to as, for example, a magnetic head. The LDU 47 is an example of a second element. The MA 48 is an example of a piezoelectric element. Note that elements may also be referred to as electrical elements or electrical components.

As illustrated in FIG. 2, the suspension 45 includes a base plate 51, a load beam 52, and a flexure 53. The base plate 51 and the load beam 52 are made of, for example, stainless steel. Note that the materials of the base plate 51 and the load beam 52 are not limited to this example. The flexure 53 is, for example, a flexible substrate including an insulating base layer, a conductive layer such as wiring provided on the base layer, a cover layer covering the wiring, and a metal backing layer reinforcing the base layer.

The base plate 51 is attached to the end of the arm 42 in the first direction D1. The load beam 52 has a plate shape thinner than the base plate 51. The load beam 52 is attached to the base plate 51 so as to protrude from the base plate 51 approximately in the first direction D1.

Figure 4:
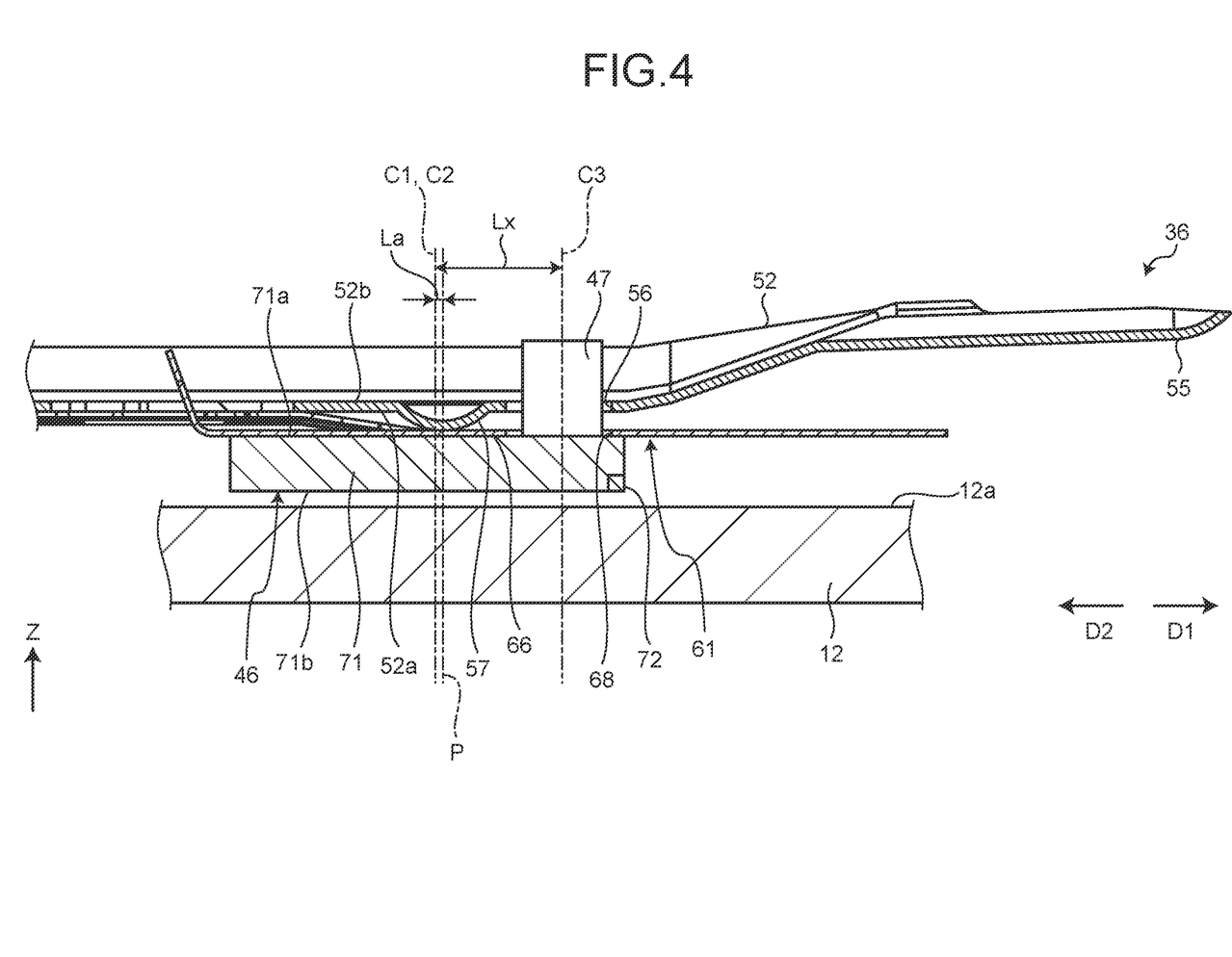
FIG. 4 is an exemplary cross-sectional view illustrating the magnetic disk and the HGA of the first embodiment.

FIG. 4 is an exemplary cross-sectional view illustrating the magnetic disk 12 and the HGA 36 of the first embodiment. As illustrated in FIG. 4, the load beam 52 has two surfaces 52a and 52b. The surfaces 52a and 52b are formed to be substantially flat. The surface 52a of each of the plurality of HGAs 36 faces the recording surface 12a of the magnetic disk 12 to which the HGA 36 corresponds. The surface 52b is opposite the surface 52a.

The load beam 52 further includes a lift tab 55. The lift tab 55 is provided at the end of the load beam 52 in the first direction D1. Further, a hole 56 is provided in the load beam 52 in the vicinity of the lift tab 55. The hole 56 penetrates the load beam 52 and opens to the two surfaces 52a and 52b.

The suspension 45 further includes a dimple 57. The dimple 57 is an example of the first protrusion. The dimple 57 protrudes from the surface 52a of the load beam 52 away from the axis Ax2 in the first direction D1. The dimple 57 is located in the vicinity of but apart from the hole 56 in the second direction D2. The dimple 57 has a substantially hemispherical shape. Note that the dimple 57 may have another shape.

As illustrated in FIG. 3, the flexure 53 has an elongated band shape. The flexure 53 includes a gimbal 61 (elastic support). The gimbal 61 is provided at one end of the flexure 53.

The gimbal 61 includes an attachment part 62, a mounting part 63, and two connecting parts 64. The attachment part 62 has, for example, a frame shape. The attachment part 62 is attached to the surface 52a of the load beam 52 by welding, for example.

The mounting part 63 is located inside the frame-shaped attachment part 62. There is a gap G between the attachment part 62 and the mounting part 63. The gap G surrounds the entire mounting part 63. The two connecting parts 64 connect the attachment part 62 and the mounting part 63 across the gap G. Note that the attachment part 62 and the mounting part 63 may be directly connected to each other.

The mounting part 63 includes a base 65, a movable part 66, and a connecting part 67. The movable part 66 is separated from the base 65 in the first direction D1. The connecting part 67 is provided between the base 65 and the movable part 66, and connects the base 65 and the movable part 66 to each other.

The connecting part 67 has a band shape thinner than both the base 65 and the movable part 66. Therefore, the base 65 and the movable part 66 can move and rotate relative to each other when the connecting part 67 is bent.

The base 65 is connected to the attachment part 62 by each of the two connecting parts 64. Each of the two connecting parts 64 has a thin band shape. Therefore, the attachment part 62 and the mounting part 63 can move and rotate relative to each other when the connecting part 64 is bent.

The movable part 66 of the mounting part 63 is supported by the dimple 57. Thus, the dimple 57 restricts the movable part 66 from moving at a contact position P between the dimple 57 and the movable part 66. The contact position P is located, for example, at the apex of the dimple 57.

The movable part 66 is rotatable around the contact position P due to the point-contact with the dimple 57. That is, at least the movable part 66 of the mounting part 63 can rotate around the contact position P with respect to the attachment part 62. As the movable part 66 rotates with respect to the attachment part 62, the base 65 and the connecting part 67 may also rotate with respect to the attachment part 62.

As illustrated in FIG. 4, the movable part 66 is provided with a hole 68. The hole 68 penetrates the movable part 66 and communicates with the hole 56 of the load beam 52 via, for example, a gap. The hole 68 is smaller than the hole 56 of the load beam 52.

As illustrated in FIG. 2, the other end of the flexure 53 is connected to one end of the FPC 37, for example, on the actuator block 41. The other end of the FPC 37 is connected to a connector provided on the bottom wall 25.

As illustrated in FIG. 3, the slider 46 is mounted on the movable part 66 of the mounting part 63. For example, the terminal of the wiring of the flexure 53 is exposed in the movable part 66. An electrode of the slider 46 is bonded to the terminal by, for example, solder. Thus, the FPC 37 is electrically connected to the slider 46 via the flexure 53.

The slider 46 is attached to the movable part 66 with, for example, an adhesive. The slider 46 may cover the base 65 and the connecting part 67. However, the slider 46 is not fixed to either the base 65 or the connecting part 67 but movable and rotatable with respect to the base 65 and connecting part 67. Note that the slider 46 is not limited to this example.

As illustrated in FIG. 4, the slider 46 includes a slider body 71 and a head element 72. The head element 72 is an example of a first element. The slider body 71 has a substantially rectangular parallelepiped block shape. Note that the shape of the slider body 71 is not limited to this example. The head element 72 is attached to the slider body 71 or incorporated in the slider body 71.

The head element 72 records and reproduces information on and from a corresponding one of the recording surfaces 12a of the plurality of magnetic disks 12. In other words, the head element 72 reads and writes information from and to the magnetic disk 12.

The head element 72 includes, for example, a write element that records information on the recording surface 12a and a read element that reproduces information from the recording surface 12a. Information is recorded when the magnetic recording layer of the recording surface 12a is magnetized in a predetermined direction by the magnetic field generated by the write element. The information recorded on the recording surface 12a is read by the read element.

The slider body 71 has an attachment surface 71a and a floating surface 71b. The floating surface 71b may also be referred to as an air bearing surface (ABS). The attachment surface 71a and the floating surface 71b are opposite to each other.

The attachment surface 71a faces the mounting part 63 and is attached to the movable part 66 of the mounting part 63. For example, an electrode of the slider 46 is provided on the attachment surface 71a. Furthermore, the attachment surface 71a is attached to the movable part 66 with an adhesive.

The floating surface 71b is substantially flat. Note that the floating surface 71b may be provided with a hole, a recess, or a cutout. The floating surface 71b faces the recording surface 12a of the magnetic disk 12 with a minute gap at least when the head element 72 reads and writes information from and to the magnetic disk 12.

The floating surface 71b can be formed of a material different from a base material of the slider body 71. For example, the base material of the slider body 71 is formed of alumina titanium carbide (ALTIC), and the floating surface 71b is formed of a diamond-like carbon (DLC) coating that covers the base material.

The slider 46 is supported by the dimple 57 via the movable part 66, for example. The slider 46 and the movable part 66 can integrally rotate around the contact position P with respect to the attachment part 62.

The LDU 47 is attached to the slider body 71 of the slider 46. That is, the LDU 47 is an additional component attached to the slider 46. Note that the slider 46 and the LDU 47 may be integrally formed as long as the slider 46 and the LDU 47 can be individually identified.

FIG. 3 illustrates the HGA 36 on a projection plane as viewed in a direction orthogonal to the floating surface 71b. As illustrated in FIG. 3, on the projection plane as viewed in the direction orthogonal to the floating surface 71b, the LDU 47 is spaced from a geometric center C1 of the floating surface 71b in the first direction D1.

As illustrated in FIG. 4, the LDU 47 protrudes from the attachment surface 71a of the slider body 71. The LDU 47 protrudes from the surface 52b of the load beam 52 through the hole 68 of the movable part 66 and the hole 56 of the load beam 52.

The LDU 47 irradiates a minute area, to be recorded information, of the magnetic recording layer on the recording surface 12a of the magnetic disk 12 with laser light to heat the minute area. By heating, the minute area decreases in coercivity, allowing easier recording of information. That is, the HDD 10 is a heat assisted magnetic recording (HAMR) HDD. Note that the HDD 10 is not limited to this example.

The LDU 47 includes, for example, a laser oscillation element and a lens. Note that the LDU 47 is not limited to this example, and may include, for example, a near-field light generation member that converts laser light into near-field light. In this case, the LDU 47 irradiates the recording surface 12a with near-field light.

MA 48 in FIG. 3 is, for example, a bulk piezoelectric element. Note that the MA 48 may be a bulk and multilayer or thin-film piezoelectric element. Each of the two MAs 48 is mounted on the mounting part 63. For example, one electrode of the MA 48 is bonded to the base 65, and the other electrode of the MA 48 is bonded to the movable part 66. In other words, each of the two MAs 48 connects the base 65 and the movable part 66. The slider 46 and the connecting part 67 are located between the two MAs 48.

The MA 48 extends and contracts in response to an applied voltage. When the two MAs 48 individually extend and contract, the connecting part 67 deforms, so that the movable part 66 and the slider 46 rotate around the contact position P with respect to the base 65.

The VCM 15 illustrated in FIG. 1 rotates the carriage 35 around the axis Ax2. By rotating the carriage 35, the HGA 36 attached to the arm 42 also rotates. That is, the suspension 45 including the base plate 51, the load beam 52, and the flexure 53, and the slider 46 rotate around the axis Ax2. The carriage 35 rotates around the axis Ax2 to move the slider 46 to a desired position along the recording surface 12a of the magnetic disk 12.

When the slider 46 moves to the outermost periphery of the magnetic disk 12 due to the rotation of the carriage 35 by the VCM 15, the ramp load mechanism 16 holds the slider 46. The slider 46 held by the ramp load mechanism 16 is separated from the magnetic disk 12.

The PCB 17 is, for example, a rigid board such as a glass epoxy board, and is a multilayer board, a build-up board, or the like. The PCB 17 is arranged outside the housing 11 and is attached to the bottom wall 25 of the base 21.

Various electronic components such as a relay connector connected to the FPC 37, an interface (I/F) connector connected to the host computer, and a controller that controls the operation of the HDD 10 are mounted on the PCB 17. The relay connector is electrically connected to the FPC 37 via a connector provided on the bottom wall 25.

The PCB 17 is electrically connected to the slider 46, the LDU 47, and the MA 48 through the FPC 37 and the flexure 53. The controller of the PCB 17 causes the head element 72 of the slider 46 to read and write information from and to the magnetic disk 12. The controller of the PCB 17 causes the LDU 47 to irradiate the recording surface 12a with laser light. Furthermore, the controller of the PCB 17 extends and contracts the MA 48 to adjust the position of the head element 72.

As illustrated in FIG. 3, the contact position P is located between a geometric center C2 of the slider 46 and a center of gravity C3 of the LDU 47 on the projection plane as viewed in the direction orthogonal to the floating surface 71b. In other words, on the projection plane as viewed in the direction orthogonal to the floating surface 71b, the contact position P is apart from the geometric center C2 of the slider 46 in the first direction D1 and from the center of gravity C3 of the LDU 47 in the second direction D2. In the present embodiment, the geometric center C2 of the slider 46 substantially matches the geometric center C1 of the floating surface 71b.

In the example of FIG. 3, the contact position P, the geometric center C2, and the center of gravity C3 are linearly aligned. However, the contact position P may shift from a virtual straight line connecting the geometric center C2 and the center of gravity C3. The contact position P may be located between the geometric center C2 and the center of gravity C3 in the longitudinal direction (the first direction D1 or the second direction D2) of the load beam 52.

In the present embodiment, the relationship among a distance La, a distance Lx, a mass m, and a mass M on the projection plane viewed in the direction orthogonal to the floating surface 71b can be expressed by the following Formula 1:

$$La = m \times Lx / (M + m).$$

La represents a distance between the contact position P and the geometric center C2 of the slider 46. Lx represents a distance between the center of gravity C3 of the LDU 47 and the geometric center C2 of the slider 46. m represents the mass of the LDU 47. M represents the sum of the masses of the mounting part 63 and the slider 46. That is, M represents the mass of the objects rotated by the MA 48 excluding the LDU 47.

For example, on the projection plane as viewed in the direction orthogonal to the floating surface 71b, the contact position P is apart from the geometric center C2 of the slider 46 by 15 µm or more in the first direction D1. In other words, a distance between the contact position P and the geometric center C2 is 15 µm or more. In addition, the distance La is larger than 10% of the length of the LDU 47 in the first direction D1. Note that the contact position P is not limited to the above example.

Generally, in HDDs other than HAMR, the center of gravity of the slider coincides with the geometric center of the slider. In the present embodiment, however, the slider 46 has the additional LDU 47 attached, so that the center of gravity of the slider 46 and the LDU 47 shifts from the center of gravity of the slider 46 alone in the first direction D1.

As described above, the contact position P is apart from the geometric center C2 of the slider 46 in the first direction D1. For this reason, the contact position P is closer to the center of gravity of the slider 46 and the LDU 47 as a whole than the geometric center C2 of the slider 46 on the projection plane as viewed in the direction orthogonal to the floating surface 71b.

When the MA 48 rotates the slider 46 and the movable part 66 around the contact position P, if the center of gravity of the slider 46 and the LDU 47 as a whole deviates from the contact position P, the HGA 36 may vibrate in a direction along the surfaces 52a and 52b of the load beam 52. However, in the present embodiment, since the contact position P coincides with or is close to the center of gravity of the slider 46 and the LDU 47 as a whole, the vibration of the HGA 36 is suppressed.

Since the vibration when the MA 48 is driven is suppressed, the MA 48 can arrange the head element 72 of the slider 46 above a desired area of the recording surface 12a. That is, the HDD 10 of the present embodiment can improve the positioning accuracy of the head element 72.

Furthermore, when the slider 46 is located above the recording surface 12a, a disturbance such as collision between the slider 46 and a protrusion present on the recording surface 12a may occur. In this case, the HGA 36 vibrates such that the distance between the recording surface 12a and the floating surface 71b varies.

If the center of gravity of the slider 46 and the LDU 47 as a whole deviates from the contact position P, the amplitude of the vibration increases. However, in the HDD 10 of the present embodiment, since the contact position P coincides with or is close to the center of gravity of the slider 46 and the LDU 47 as a whole, the vibration of the HGA 36 is suppressed.

In addition, when the slider 46 moves between a load position above the recording surface 12a and an unload position held by the ramp load mechanism 16, the HGA 36 vibrates. If the center of gravity of the slider 46 and the LDU 47 as a whole deviates from the contact position P, the amplitude of the vibration increases. However, in the HDD 10 of the present embodiment, since the contact position P coincides with or is close to the center of gravity of the slider 46 and the LDU 47 as a whole, the vibration of the HGA 36 is suppressed.

In the HDD 10 according to the first embodiment described above, the slider 46 is mounted on the mounting part 63 of the flexure 53. The slider 46 includes the head element 72 and the floating surface 71b. The head element 72 is configured to read and write information from and to the magnetic disk 12. The floating surface 71b is configured to face the recording surface 12a when the head element 72 reads and writes information from and to the magnetic disk 12. The LDU 47 is attached to the slider 46 apart from the geometric center C1 of the floating surface 71b in the first direction D1. On the projection plane as viewed in the direction orthogonal to the floating surface 71b, the contact position P between the dimple 57 and the mounting part 63 is located between the geometric center C2 of the slider 46 and the center of gravity C3 of the LDU 47. In the case of the slider 46 with no LDU 47 attached, the center of gravity typically coincides with the geometric center C2 of the slider 46 on the projection plane. Attaching the LDU 47 to the slider 46 may however shift the center of gravity of the slider 46 and the LDU 47 as a whole from the geometric center C2 of the slider 46 in the first direction D1. However, in the present embodiment, the contact position P is set close to the center of gravity of the slider 46 and the LDU 47 as a whole. In other words, the displacement between the center of gravity of the slider 46 and LDU 47 as a whole and the contact position P between the dimple 57 and the mounting part 63 serving as the center of rotation of the slider 46 mounted on the mounting part 63 decreases. As such, the HDD 10 enables improvement in accuracy of positioning the head element 72 around the contact position P. For example, at the time when the MA 48 rotates the slider 46 around the contact position P, the above-described displacement may cause the load beam 52 to vibrate in the direction along the surfaces 52a and 52b of the load beam 52 from which the dimple 57 protrudes. Furthermore, while the floating surface 71b of the slider 46 floats from the recording surface 12a of the magnetic disk 12, the slider 46 may contact with an obstacle on the recording surface 12a and vibrate, for example. For another example, the slider 46 may vibrate while moving to the unload position. The HDD 10 according to the present embodiment can avoid at least one of such vibrations.

The LDU 47 protrudes from the attachment surface 71a of the slider 46, the attachment surface 71a being opposite the floating surface 71b. That is, the LDU 47 is too large in size to be completely incorporated in the slider 46. Because of such a size of the LDU 47, the center of gravity of the LDU 47 and the slider 46 as a whole displaces from the geometric center C2 of the slider 46. However, in the HDD 10 of the present embodiment, the contact position P can be set closer to the center of gravity of the slider 46 and the LDU 47 as a whole, thereby decreasing the displacement between the contact position P and the center of gravity of the slider 46 and the LDU 47 as a whole.

The LDU 47 is configured to irradiate the recording surface 12a with laser light. That is, the HDD 10 of the present embodiment is a HAMR HDD. Thus, the LDU 47 can improve the recording density of information on the magnetic disk 12. Meanwhile, the LDU 47 that emits the laser light is typically too large in size to be completely incorporated in the slider 46, resulting in displacing the center of gravity of the LDU 47 and the slider 46 as a whole from the geometric center C2 of the slider 46. However, the HDD 10 of the present embodiment can allow the contact position P to be closer to the center of gravity of the LDU 47 and the slider 46 as a whole.

The MA 48 is mounted on the mounting part 63. As a result, the MA 48 rotate the slider 46 around the contact position P to be able to position the head element 72 with improved accuracy. However, the above-described displacement may cause the load beam 52 to vibrate in the direction along the surfaces 52a and 52b of the load beam 52 at the time when the MA 48 rotates the slider 46 around the contact position P. In this regard, the HDD 10 of the present embodiment can prevent or lessen such vibration.

On the projection plane as viewed in the direction orthogonal to the floating surface 71b, the contact position P is closer to the center of gravity of the slider 46 and the LDU 47 as a whole than the geometric center C2 of the slider 46. This can decrease the displacement between the contact position P and the center of gravity of the slider 46 and the LDU 47 as a whole. Consequently, the HDD 10 enables improvement in accuracy of positioning the head element 72 around the contact position P.

Second Embodiment

Hereinafter, a second embodiment will be described with reference to FIGS. 5 and 6. In the following description of the embodiment, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 5:
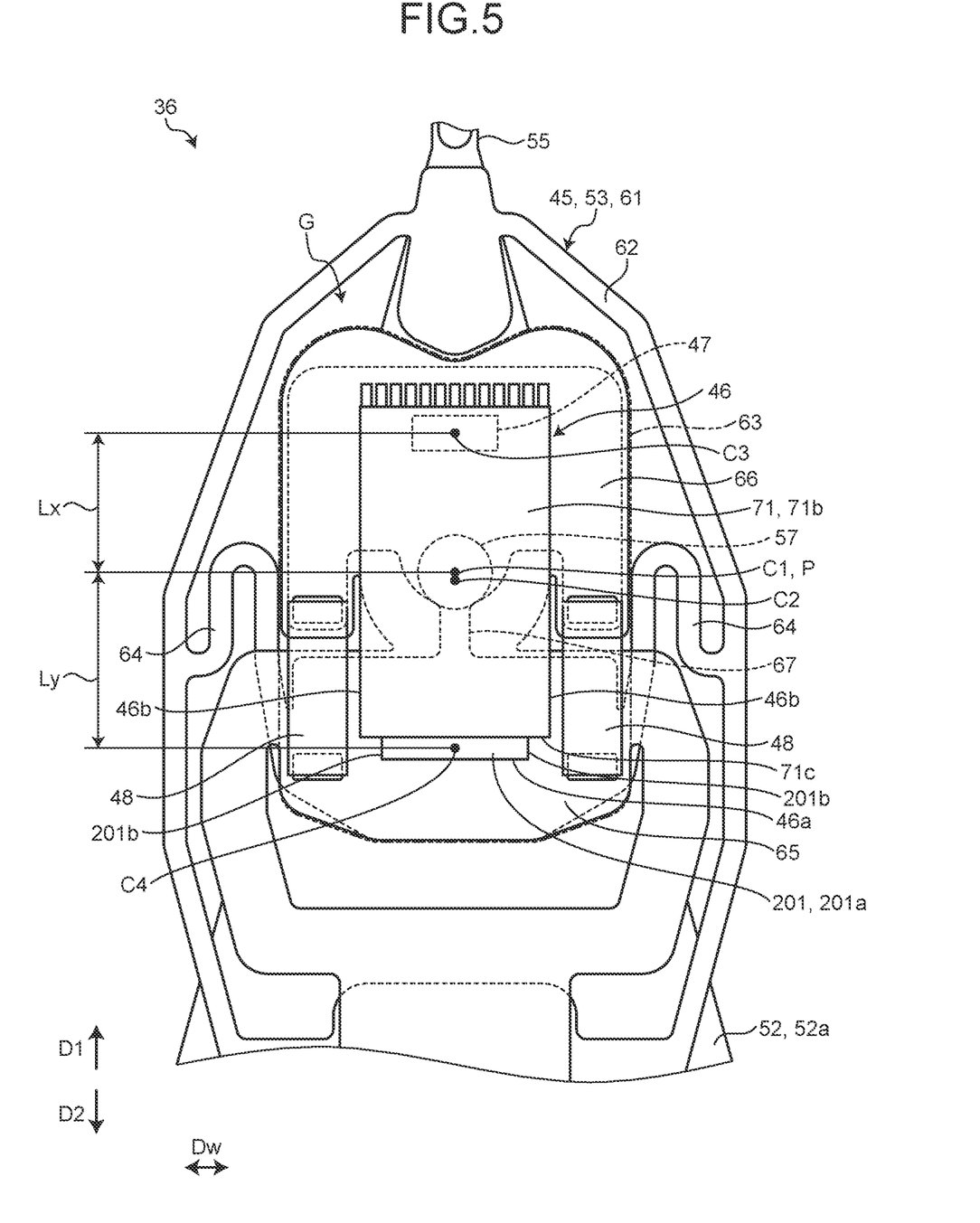
FIG. 5 is an exemplary plan view illustrating a part of an HGA according to a second embodiment.

FIG. 5 is an exemplary plan view illustrating a part of the HGA 36 according to the second embodiment. As illustrated in FIG. 5, the slider 46 further includes an extending part 201. The extending part 201 is an example of a second protrusion.

The extending part 201 protrudes from the slider body 71 in the second direction D2. The extending part 201 is integrated with the slider body 71. The extending part 201 may be additionally attached to the slider body 71.

Figure 6:
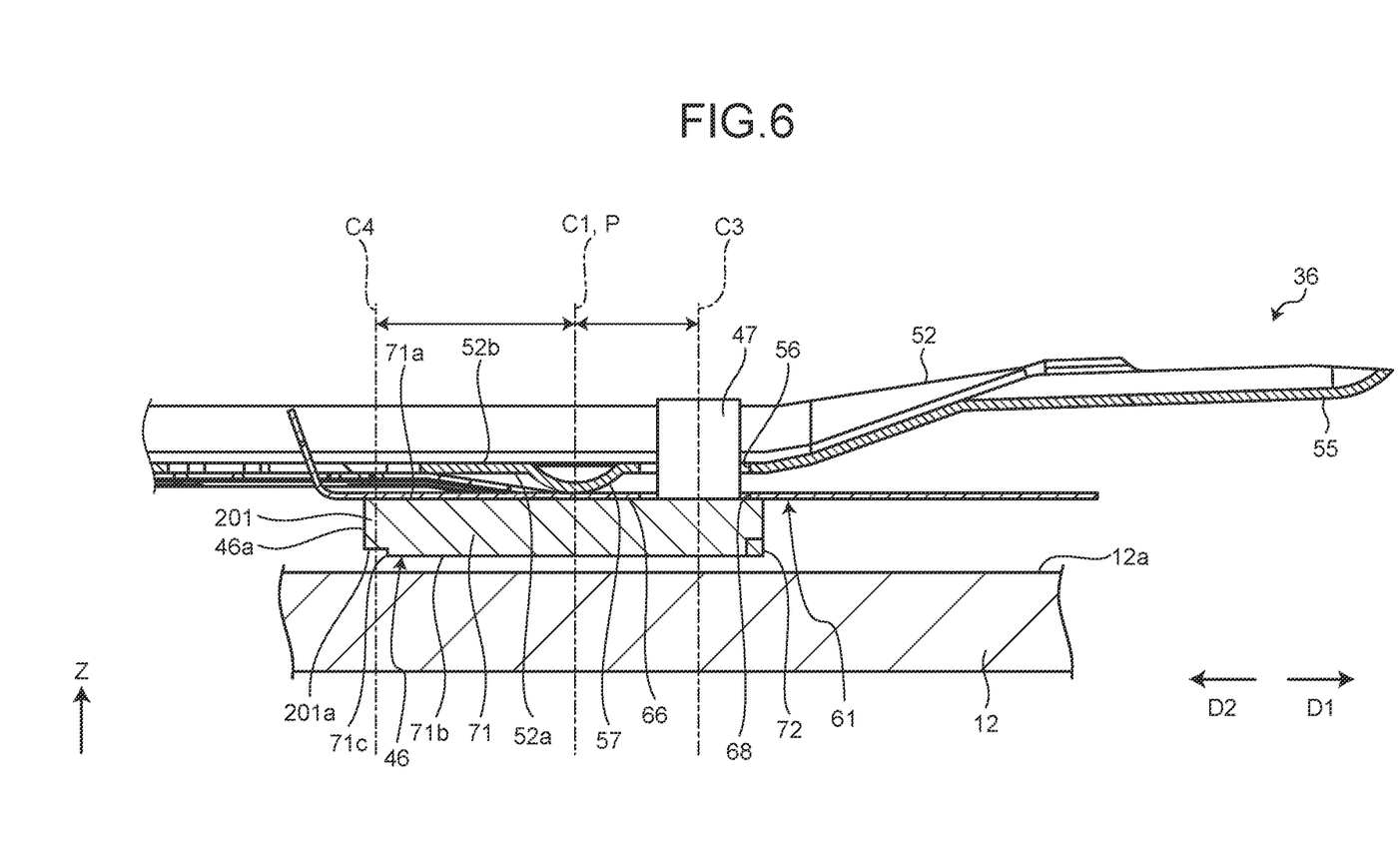
FIG. 6 is an exemplary cross-sectional view illustrating the magnetic disk and the HGA of the second embodiment.

FIG. 6 is an exemplary cross-sectional view illustrating the magnetic disk 12 and the HGA 36 of the second embodiment. As illustrated in FIG. 6, the extending part 201 has a bottom surface 201a. The bottom surface 201a faces the recording surface 12a of the magnetic disk 12 at least when the head element 72 reads and writes information from and to the magnetic disk 12.

The bottom surface 201a is farther apart from the recording surface 12a than the floating surface 71b. That is, when the head element 72 reads and writes information from and to the magnetic disk 12, there is a longer distance between the recording surface 12a and the bottom surface 201a than between the recording surface 12a and the floating surface 71b.

The extending part 201 can be distinguished from the slider body 71 based on the bottom surface 201a. That is, the part of the slider 46 having the substantially flat floating surface 71b is the slider body 71, and the part having the bottom surface 201a separated farther from the recording surface 12a than the floating surface 71b is the extending part 201.

In the example of FIG. 6, the bottom surface 201a is a plane substantially parallel to the floating surface 71b. Note that the bottom surface 201a is not limited to this example. For example, the bottom surface 201a may extend obliquely with respect to the floating surface 71b from an end 71c of the floating surface 71b in the second direction D2 toward the flexure 53.

Due to the inclusion of the extending part 201, in the second direction D2 an end 46a of the slider 46 is apart from the end 71c of the floating surface 71b. In the present embodiment, the end of the extending part 201 in the second direction D2 is the end 46a of the slider 46 in the second direction D2. However, the end 46a of the slider 46 in the second direction D2 may be formed by another portion.

The extending part 201 extends between the end 71c of the floating surface 71b and the end 46a of the slider 46 in the second direction D2. For this reason, the extending part 201 can be distinguished from the slider body 71 by the end 71c of the floating surface 71b. That is, the part of the slider 46 between the end 71c of the floating surface 71b and the end 46a of the slider 46 corresponds to the extending part 201. Note that the extending part 201 may be distinguished from the slider body 71 based on other factors.

As illustrated in FIG. 5, a width direction Dw is defined for convenience. The width direction Dw is a direction orthogonal to the first direction D1 and along the floating surface 71b. In the width direction Dw, both ends 201b of the extending part 201 are located more inside than both ends 46b of the slider 46. For this reason, the length of the extending part 201 along the width is shorter than the length of the slider body 71 in the width direction Dw.

The relationship among a distance Lx, a distance Ly, a mass m, and a mass n on the projection plane viewed in the direction orthogonal to the floating surface 71b can be expressed by the following Formula 2:

$$Ly = m \times Lx/n.$$

Ly represents a distance between a center of gravity C4 of the extending part 201 and the geometric center C1 of the floating surface 71b. n represents the mass of the extending part 201.

In the present embodiment, the contact position P is located at the geometric center C1 of the floating surface 71b on the projection plane viewed in the direction orthogonal to the floating surface 71b. Note that the contact position P may be different from the geometric center C1 of the floating surface 71b.

In general, the geometric center of the slider that is not provided with the extending part 201 due to non-HAMR is located at the geometric center of the floating surface. On the other hand, in the present embodiment, since the slider 46 has the extending part 201, the geometric center C2 and the center of gravity of the slider 46 move in the second direction D2 from the geometric center C1 of the floating surface 71b. On the other hand, since the additional LDU 47 is attached to the slider 46, the center of gravity of the slider 46 and the LDU 47 as a whole moves in the first direction D1 from the center of gravity of the slider 46. Therefore, the center of gravity of the slider 46 and the LDU 47 as a whole is consequently located near the geometric center C1 of the floating surface 71b.

As described above, the contact position P is located at the geometric center C1 of the floating surface 71b. For this reason, the contact position P is closer to the center of gravity of the slider 46 and the LDU 47 as a whole than the geometric center C2 of the slider 46 on the projection plane viewed in the direction orthogonal to the floating surface 71b.

In the HDD 10 of the second embodiment described above, in the second direction D2 opposite to the first direction D1, the end 46a of the slider 46 is apart from the end 71c of the floating surface 71b. The slider 46 further includes the extending part 201 located between the end 71c of the floating surface 71b and the end 46a of the slider 46 in the second direction D2 and configured to farther apart from the recording surface 12a than the floating surface 71b. Thus, adding the extending part 201 to the slider 46 results in shifting the geometric center C2 of the slider 46 from the center of gravity of the slider 46 and the LDU 47 as a whole in the second direction D2. On the projection plane as viewed in the direction orthogonal to the floating surface 71b, the contact position P is typically located at the geometric center C1 of the floating surface 71b. In the HDD 10 of the present embodiment, the contact position P can be set closer to the center of gravity of the slider 46 and the LDU 47 as a whole irrespective of the dimple 57 in contact with the mounting portion 63 at the geometric center C1.

In the width direction Dw orthogonal to the first direction D1 and along the floating surface 71b, both ends 201b of the extending part 201 are located more inside than both ends 46b of the slider 46. Because of this, the extending part 201 can prevent the slider 46 from colliding with other parts while being rotated around the contact position P by the MA 48, for example.

MODIFICATION

Figure 7:
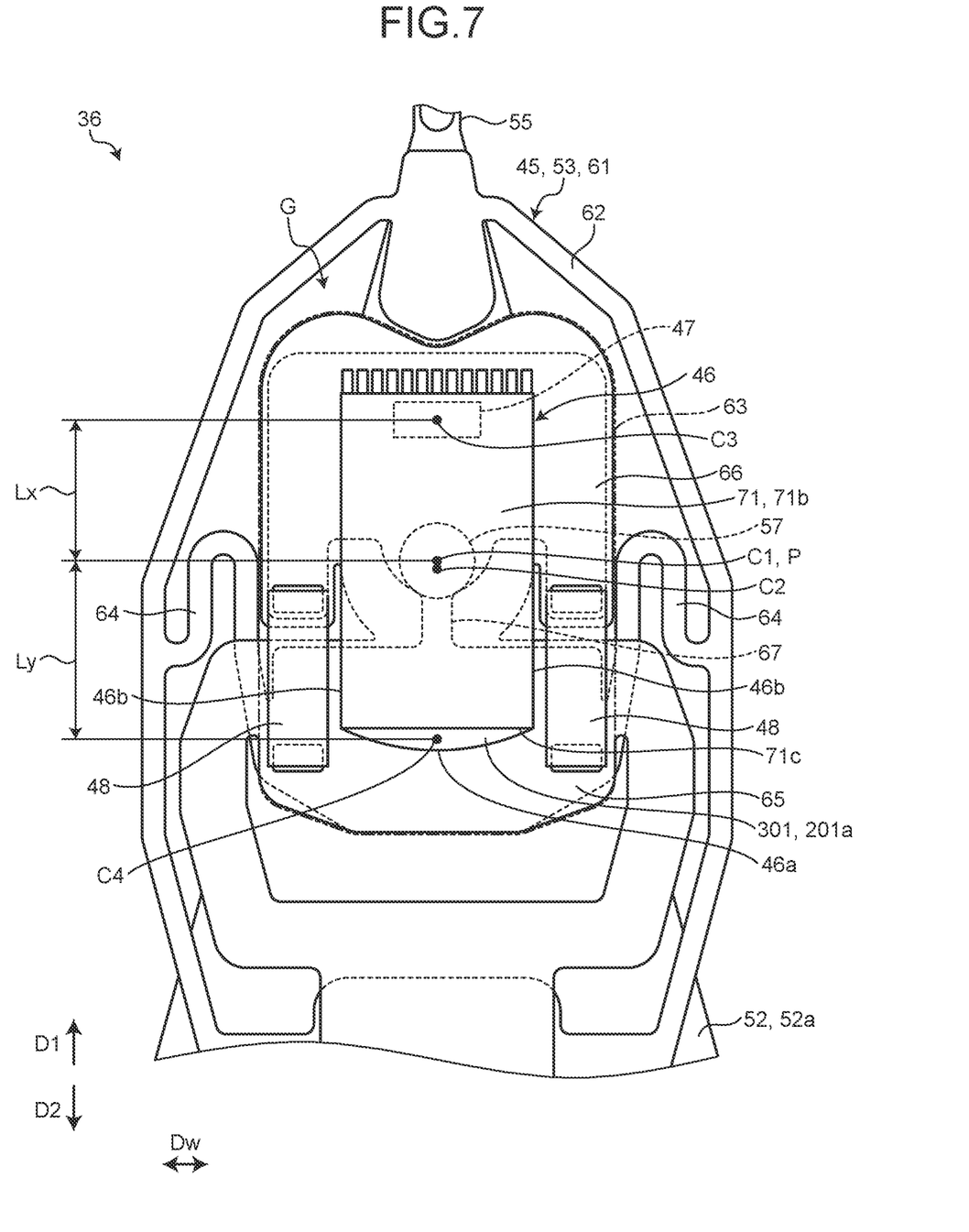
FIG. 7 is an exemplary plan view illustrating a part of an HGA according to one modification of the second embodiment.

Hereinafter, a modification of the second embodiment will be described with reference to FIGS. 7 and 8. FIG. 7 is an exemplary plan view illustrating a part of the HGA 36 according to one modification of the second embodiment. As illustrated in FIG. 7, the slider 46 may have an extending part 301 instead of the extending part 201. The extending part 301 is substantially identical to the extending part 201 except an aspect described below.

The extending part 301 protrudes from the slider body 71 such that the central portion of the extending part 301 in the width direction Dw is the longest. In other words, the length of the extending part 301 in the first direction D1 (or the second direction) is shorter at a position closer to both ends 46b of the slider 46 in the width direction Dw. As a result, the extending part 301 can suppress collision with other portions, for example, when the slider 46 is rotated around the contact position P by the MA 48.

Figure 8:
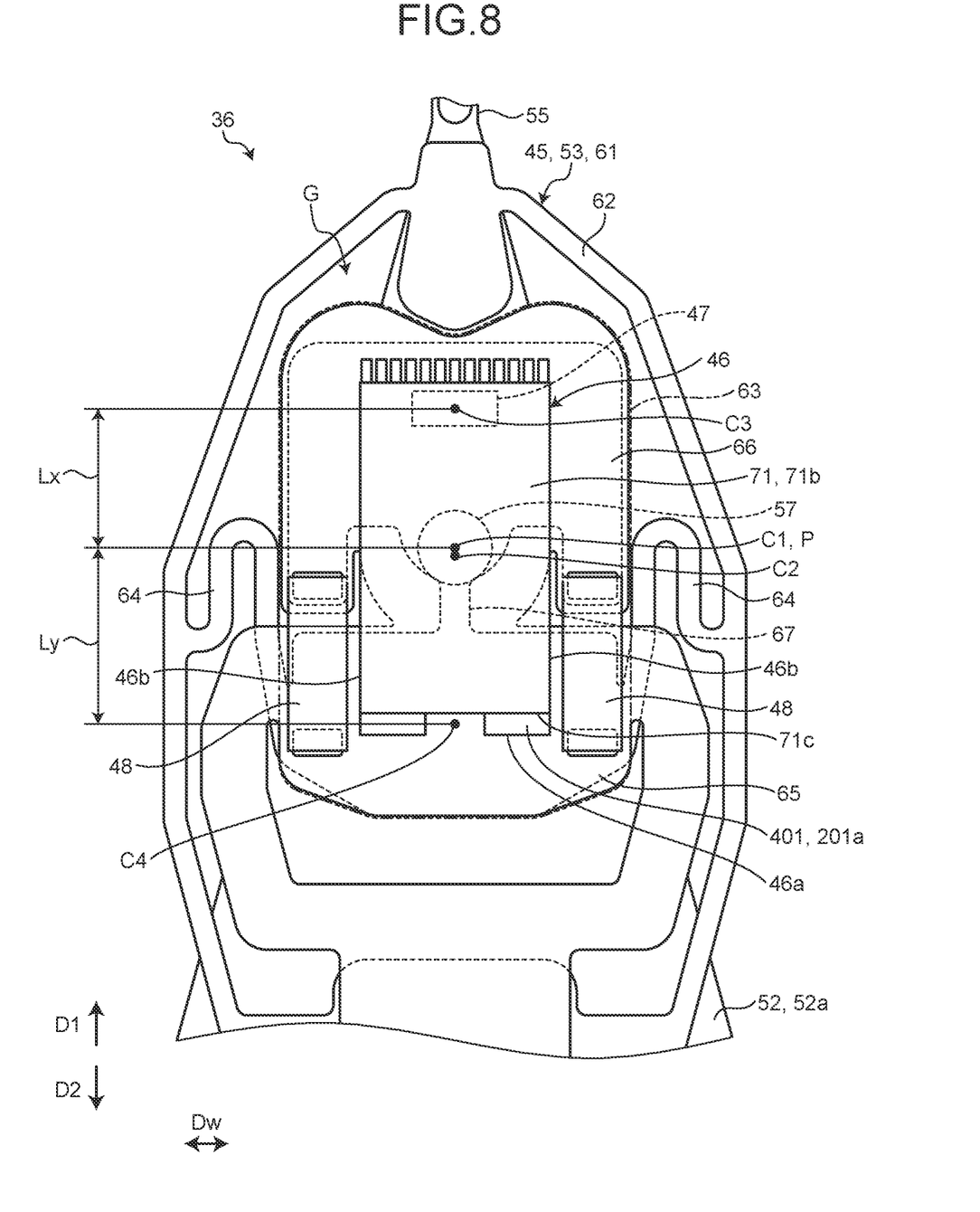
FIG. 8 is an exemplary plan view illustrating a part of an HGA according to another modification of the second embodiment.

FIG. 8 is an exemplary plan view illustrating a part of the HGA 36 according to another modification of the second embodiment. As illustrated in FIG. 8, the slider 46 may have a plurality of extending parts 401 instead of the extending part 201. The extending part 401 is substantially equal to the extending part 201 except an aspect described below.

The slider 46 has, for example, two extending parts 401. The two extending parts 401 are separated from each other in the width direction Dw. Note that the slider 46 may have three or more extending parts 401. The extending part 401 may be located at both ends 46b of the slider 46 in the width direction Dw.

As in the plurality of modifications of the second embodiment described above, the extending parts 201, 301, and 401 may have various shapes. The shape of the extending parts 201, 301, and 401 can be determined by various factors such as the arrangement of components in the HDD 10.

In the above embodiment, the LDU 47 is an example of the second element. However, the second element is not limited to this example. For example, the second element may be another element such as an element that generates a microwave.

In the above description, "suppress" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a magnetic disk having a recording surface;
   a load beam rotatable around a rotation axis;
   a first protrusion protruding from the load beam away from the rotation axis in a first direction orthogonal to the rotation axis;
   a flexure including an attachment part attached to the load beam, and a mounting part rotatably supported by the first protrusion with respect to the attachment part;
   a slider mounted on the mounting part, including:
   a first element configured to read and write information from and to the magnetic disk, and
   a floating surface configured to face the recording surface when the first element reads and writes information from and to the magnetic disk; and
   a second element attached to the slider apart from a geometric center of the floating surface in the first direction, wherein
   on a projection plane as viewed in a direction orthogonal to the floating surface, a contact position between the first protrusion and the mounting part is located between a geometric center of the slider and a center of gravity of the second element.

2. The disk device according to claim 1, wherein
   the second element protrudes from a surface of the slider, the surface being opposite the floating surface.
3. The disk device according to claim 2, wherein
   the second element is configured to irradiate the recording surface with laser light.
4. The disk device according to claim 1, further comprising
   a piezoelectric element mounted on the mounting part.
5. The disk device according to claim 1, wherein
   on the projection plane as viewed in the direction orthogonal to the floating surface, a distance between the geometric center of the slider and the contact position between the first protrusion and the mounting part is set to a value obtained by dividing a product of a mass of the second element and a distance between the center of gravity of the second element and the geometric center of the slider by a sum of a total mass of the mounting part and the slider and the mass of the second element.
6. The disk device according to claim 1, wherein
   in a second direction opposite to the first direction, an end of the slider is apart from an end of the floating surface, and
   the slider further includes a second protrusion located between the end of the floating surface and the end of the slider in the second direction, and configured to be farther apart from the recording surface than the floating surface.
7. The disk device according to claim 6, wherein
   on the projection plane as viewed in the direction orthogonal to the floating surface, a distance between a center of gravity of the second protrusion and the geometric center of the floating surface is set to a value obtained by dividing a product of the mass of the second element and a distance between the center of gravity of the second element and the geometric center of the floating surface by a mass of the second protrusion.
8. The disk device according to claim 6, wherein
   in a direction orthogonal to the first direction and along the floating surface, both ends of the second protrusion are located more inside than both ends of the slider.
9. The disk device according to claim 1, wherein
   on the projection plane as viewed in the direction orthogonal to the floating surface, the contact position between the first protrusion and the mounting part is apart from the geometric center of the slider by 15 μm or more in the first direction.
10. The disk device according to claim 1, wherein
    on the projection plane as viewed in the direction orthogonal to the floating surface, a distance between the geometric center of the slider and the contact position between the first protrusion and the mounting part is larger than 10% of a length of the second element in the first direction.
11. The disk device according to claim 1, wherein
    on the projection plane as viewed in the direction orthogonal to the floating surface, the contact position between the first protrusion and the mounting part is closer to a center of gravity of the slider and the second element as a whole than the geometric center of the slider.

* * * * *